W. SCOTT.
Guard Finger for Harvesters.

No. 237,613. Patented Feb. 8, 1881.

Witnesses:
W. B. Masson
W. E. Bowen

Inventor
Walter Scott
by E. E. Masson
atty

UNITED STATES PATENT OFFICE.

WALTER SCOTT, OF HOOSICK FALLS, N. Y., ASSIGNOR TO WALTER A. WOOD MOWING AND REAPING MACHINE COMPANY, OF SAME PLACE.

GUARD-FINGER FOR HARVESTERS.

SPECIFICATION forming part of Letters Patent No. 237,613, dated February 8, 1881.

Application filed February 3, 1880.

*To all whom it may concern:*

Be it known that I, WALTER SCOTT, of Hoosick Falls, in the county of Rensselaer and State of New York, have invented certain new and useful Improvements in Guard-Fingers for Harvesters, of which the following is a specification.

This invention relates to certain improvements in guard-fingers for harvesters, of that class constructed with horns or projections at each side, which horns abut against each other forming side supports therefor when the fingers are in place, and whereby the shanks of said fingers may be made short, and the fastenings necessary to secure the same to the finger-bar diminished in number and a narrow finger-bar rendered practicable.

Heretofore the stationary cutters or ledger-blades attached to or forming part of the guard-fingers have been placed on springs and made yielding, or secured to said guard-fingers in recesses, in such manner as to be flush with the upper faces of the horns thereof. As thus constructed the horns and stationary cutters form a continuous surface over which the reciprocating cutters travel, and upon which the sap or gum of the material being cut finds a lodging, gumming the parts, increasing the friction and interfering with the efficient operation of the cutters.

My invention is designed to obviate the above-enumerated objections; and to this end it consists in a guard-finger for harvesters constructed with a top or shield, and with the cutting-edges of the ledger-blade entirely above the horns, so as to leave intervening spaces for the escape of the sap or gummy substances, and present cutting-edges the whole length of the ledger-blade, the said guard being preferably provided with a projection made to engage with the ledger-blade to relieve the rivet connecting the same thereto of undue side strain, as more fully hereinafter specified.

Figure 1:
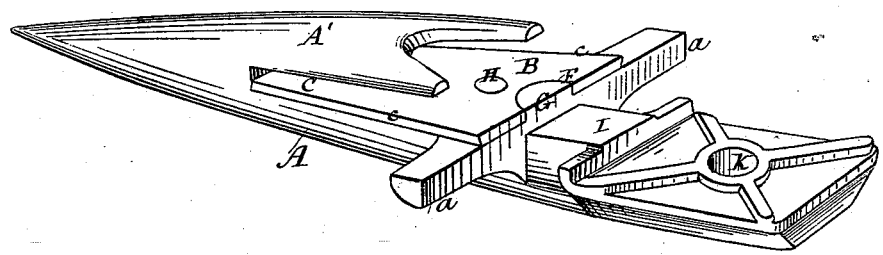
Figure 2:
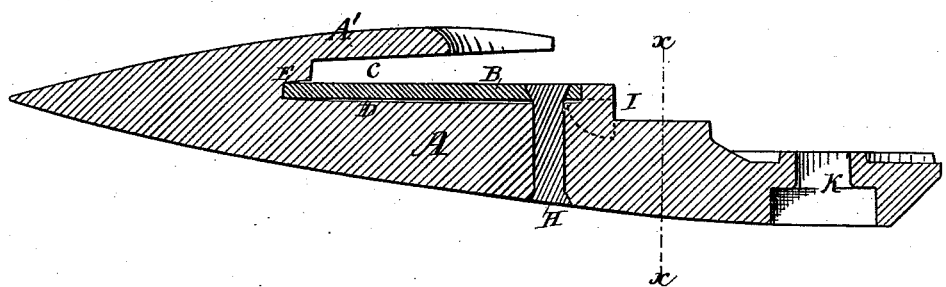
Figure 3:
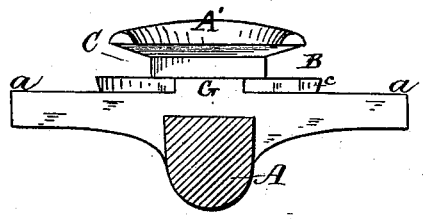

In the drawings, Figure 1 represents a perspective view of a guard-finger showing my improvement; Fig. 2, a longitudinal vertical section of the same; Fig. 3, a transverse vertical section of the guard-finger on the line $x$ $x$ of Fig. 2.

The letter A indicates the body or under portion of a guard-finger for a harvester or mower provided with the ordinary horns or projections $a$ at each side, and B the ledger-blade secured to said guard, above its central portion or body in the recess C, through which the reciprocating cutters of the harvester travel, said recess being formed between the top or shield A' and the body of the guard. The said ledger-blade consists of a flat piece of hardened steel provided with slightly beveled cutting-edges, $c$ $c$, and of proper configuration to overhang but nearly correspond with the shape of the under portion of the guard. Said blade or plate is adapted to sit upon a seat, D, on the guard, the said seat being formed by the body or lateral edges thereof, as said guard may be made hollow, or flat and solid as in the present instance. The forward end of the ledger-plate when in place fits into a socket, E, at the front of the recess C in the guard-finger, the rear of said plate being provided with a preferably semicircular recess, F, which fits upon a corresponding semicircular projection, G, formed on the guard, which serves to relieve the rivet H by which said plate is attached thereto, and thus imparts additional strength to the device. The guard is formed with the usual offset I, forming the bearing for the cutter-bar, and each of a series is retained in position by the abutting horns and the bolt which passes through the aperture K in its shank, a single bolt thus securely fastening the guard-fingers to the finger-bar.

It will be perceived that, as the cutting-edges of the ledger-blades are entirely above the horns or projections at each side of the guard-fingers, no recesses need be formed therein, and the continuity of surface is thus broken, leaving spaces between the rear portions of the ledger-blades by which any gumming substance may escape, and that a clear cutting-edge extending the whole length of the ledger-blade on each side is presented to the blades of the reciprocating knives.

Having thus fully described my invention, what I claim and desire to secure by Letters Patent, is—

1. In combination with a guard-finger of a harvester provided with horns or projections at each side, an unyielding ledger-plate having its cutting-edges above the face of the horns and its rear end in line with the rear thereof, whereby gumming is prevented, substantially as specified.

2. The combination, with the guard-finger of a harvester, of the unyielding ledger-blade thereof, having its bottom and cutting-edges above the horns of said guard and provided with a recess at its rear, the rivet H and projection G on the guard-finger, whereby the confining-rivet is relieved of a portion of its strain, substantially as specified.

3. In a harvester guard-finger, the combination of the body A, its top or shield A′, the horns $a$ on each side, and an unyielding ledger-plate having its cutting-edges located above the upper surface of said horns and its rear end in line therewith, substantially as and for the purpose specified.

WALTER SCOTT.

Witnesses:
J. RUSSELL PARSONS,
DANFORTH GEER.